United States Patent
Marioni

(10) Patent No.: US 7,462,966 B2
(45) Date of Patent: Dec. 9, 2008

(54) SYNCHRONOUS ELECTRIC MOTOR, PARTICULARLY FOR WASHING-MACHINES AND SIMILAR HOUSEHOLD APPLIANCES, AND RELEVANT ASSEMBLING METHOD

(75) Inventor: Elio Marioni, Dueville (IT)

(73) Assignee: Askoll Holding S.r.L. (IT)

( * ) Notice: Subject to any disclaimer, the term of this patent is extended or adjusted under 35 U.S.C. 154(b) by 509 days.

(21) Appl. No.: 11/349,704

(22) Filed: Feb. 8, 2006

(65) Prior Publication Data

US 2006/0208582 A1    Sep. 21, 2006

(30) Foreign Application Priority Data

Feb. 11, 2005    (EP) .................. 05425068

(51) Int. Cl.
    *H02K 3/24* (2006.01)
(52) U.S. Cl. .................. 310/67 R; 310/64; 29/596
(58) Field of Classification Search .......... 310/67 R, 310/64, 71, 68 R, 91, 254, 162; 29/596
    See application file for complete search history.

(56) References Cited

U.S. PATENT DOCUMENTS

| 4,673,834 | A | | 6/1987 | Wrobel |
| 5,049,769 | A | | 9/1991 | Reinhardt et al. |
| 5,783,881 | A | * | 7/1998 | Best et al. ................. 310/68 C |
| 5,932,942 | A | * | 8/1999 | Patyk et al. ................. 310/58 |
| 6,380,648 | B1 | | 4/2002 | Hsu |
| 6,695,091 | B2 | * | 2/2004 | Achenbach et al. ......... 180/444 |
| 6,836,036 | B2 | * | 12/2004 | Dube ......................... 310/64 |
| 2003/0042066 | A1 | * | 3/2003 | Achenbach et al. ......... 180/446 |
| 2003/0193250 | A1 | | 10/2003 | Maslov et al. |
| 2006/0191337 | A1 | * | 8/2006 | Marioni ....................... 73/462 |
| 2006/0192448 | A1 | * | 8/2006 | Hill ............................. 310/88 |
| 2007/0063603 | A1 | * | 3/2007 | Levine et al. ................. 310/85 |

* cited by examiner

*Primary Examiner*—Gary F. Paumen
(74) *Attorney, Agent, or Firm*—Akerman Senterfitt

(57) ABSTRACT

Synchronous electric motor (3) for washing-machines (1) and similar household appliances with rotary drum (2), of the type comprising an inner stator (5) having relative stator windings (9) mounted fixed on a central axis (10), an electronic control board (18) electrically connected to the stator, and a heat sink element (20) associated with the electronic board (18). The heat sink element (20) is mounted on the stator (5) in an axial extension thereof and spaced therefrom. The electronic control board (18) is supported by the heat sink (20) on a side facing the stator (5).

32 Claims, 6 Drawing Sheets

SYNCHRONOUS ELECTRIC MOTOR, PARTICULARLY FOR WASHING-MACHINES AND SIMILAR HOUSEHOLD APPLIANCES, AND RELEVANT ASSEMBLING METHOD

FIELD OF APPLICATION

The present invention refers, in its most general aspect, to a synchronous electric motor for washing-machines and similar household appliances with rotary drum.

In particular, the synchronous electric motor according to the invention is of the type comprising an inner stator having stator windings mounted fixed on a central axis, an electronic control board electrically connected to the stator, and a heat sink element associated with the electronic board.

The present invention also concerns an assembly method of the aforementioned synchronous electric motor.

PRIOR ART

As it is well known to the skilled in the art, household washing-machines are equipped with a washing tank inside which a rotary drum that is cylindrical in shape and that can be accessed through a door of the washing-machine to load the laundry to be washed is activated.

Normally, the rotary drum of the washing-machines is actuated in rotation by electric motors structured with an inner stator which is fixed to an axis, and an outer rotor that surrounds the stator.

The drum of the washing-machine is kinematically connected to the rotor through suitable pulleys and a transmission belt.

The operation of the synchronous electric motor is also normally controlled by a specific electronic board that adjusts its operation, and it is also electrically connected to the main board of the washing-machine.

Generally, in a washing-machine, the synchronous electric motor and the respective electronic board for controlling it are set apart from one another. In practice, the electric motor is positioned in one area of the washing-machine whilst the electronic board is arranged in a separate area close to the main board and is connected to the electric motor through determined wiring.

This separation is mainly due to the need to arrange one or more heat sink devices in a single area of the washing-machine where the electronics are arranged and that can possibly be cooled with ease.

However, it is clear that this separation requires a complex wiring to connect the electronic board with the relative electric motor and also makes also the assembly of the electric motor difficult.

Moreover, the large amount of wiring involves greater maintenance costs of the electric motor in case of failure.

It has also been proposed to integrate the control board inside the motor, this however at the expense of a high cost to modify the trim of the motor itself and allow the electronic board to be housed, as well as to obtain its effective cooling.

The technical problem underlying the present invention is therefore that of providing a synchronous electric motor, for washing-machines and similar household appliances, having such a structure as to allow ease of assembly and, at the same time, a reduction of the wiring for the connection of the electronic control board.

SUMMARY OF THE INVENTION

This technical problem is solved, according to the present invention, by a synchronous electric motor of the aforementioned type wherein the heat sink element is mounted on the stator in an axial extension thereof and spaced therefrom, and wherein the electronic control board is supported on the heat sink on a side facing the stator.

The invention also concerns a synchronous electric motor as defined by claim 23.

The invention also concerns a method for assembling an electric motor with outer rotor and inner stator as defined by claim 27.

Further characteristics and advantages of the motor and of the assembly method according to the invention will become apparent from the following description of an embodiment thereof, with reference to the attached drawings, given by way of indicative and non limiting example.

DETAILED DESCRIPTION

Figure 1:
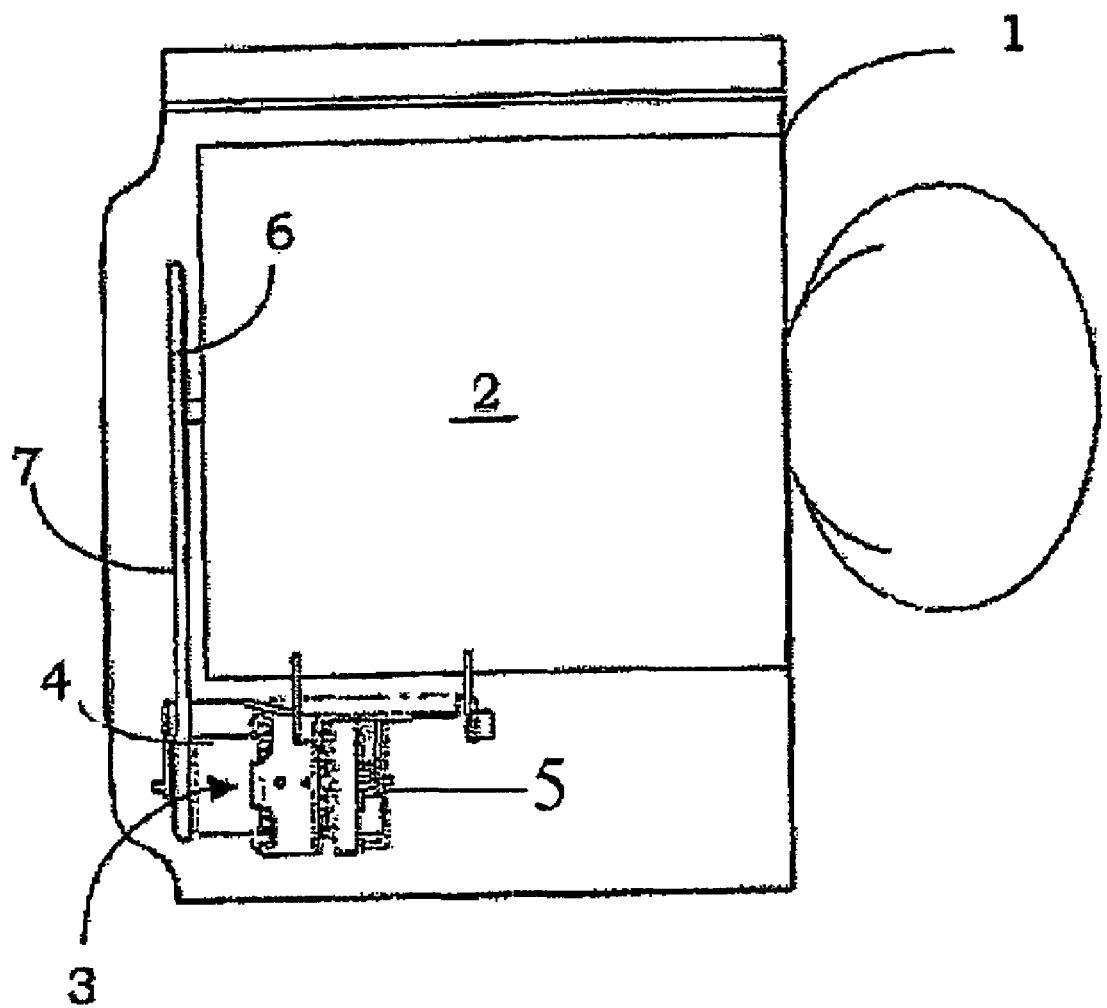
FIG. 1 schematically represents a washing-machine incorporating a synchronous electric motor according to the present invention.

With reference to FIG. 1, 1 schematically indicates a washing-machine with a rotary drum 2, for which a synchronous electric motor 3 according to the present invention is used. This electric motor is of the so-called inner stator and outer rotor type, in other words of the type wherein the rotor 4 is mounted outside the respective stator 5.

In the case of the illustrated solution, the motor 3 is kinematically connected, in a conventional way per se, to the rotary drum 2 of the washing-machine 1 through a belt and pulley connection 7 visible in FIG. 1.

Figure 2:
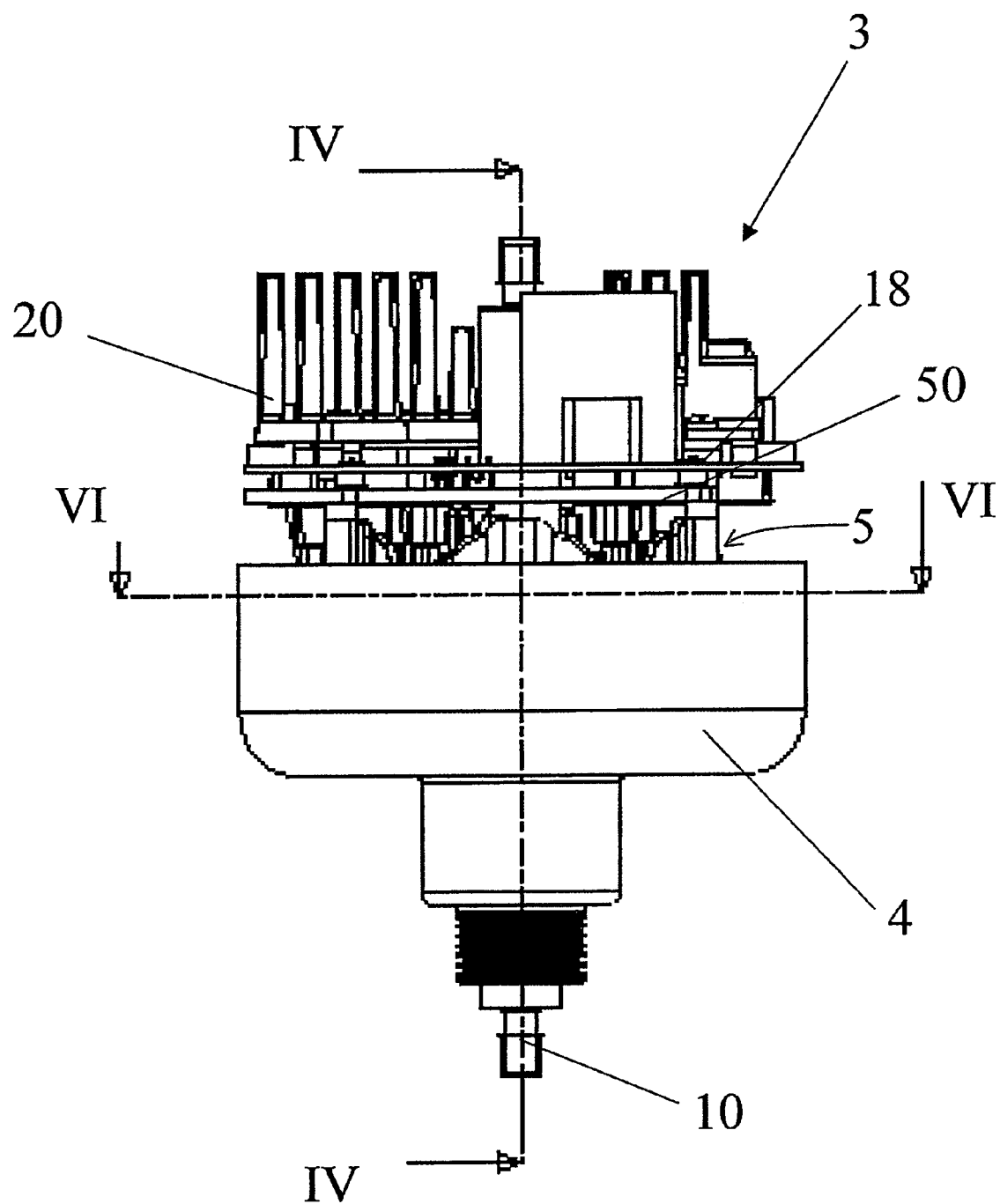
FIG. 2 illustrates a view of the synchronous electric motor according to the present invention.
Figure 3:
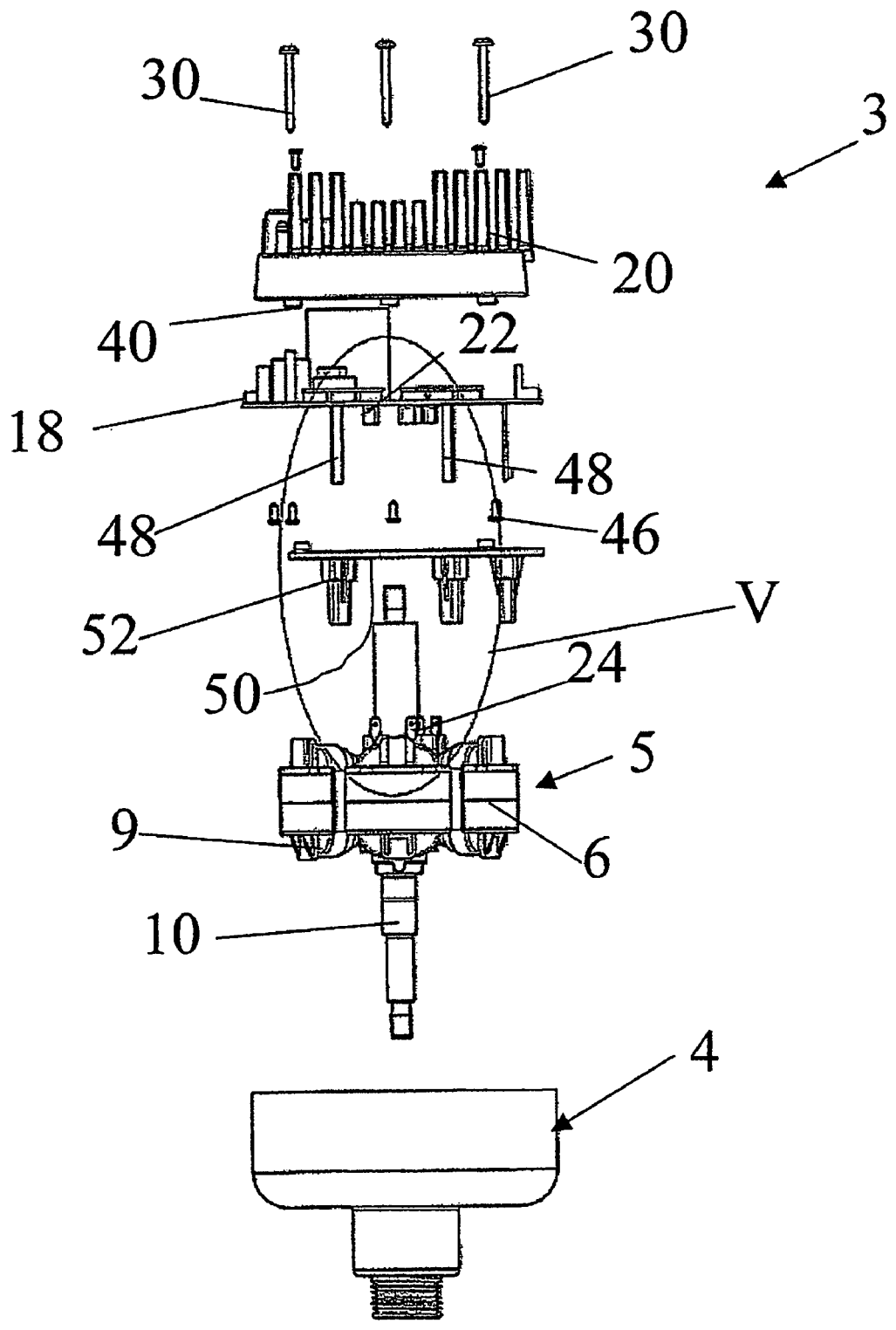
FIG. 3 illustrates the synchronous electric motor according to the present invention with separated parts.
Figure 4:
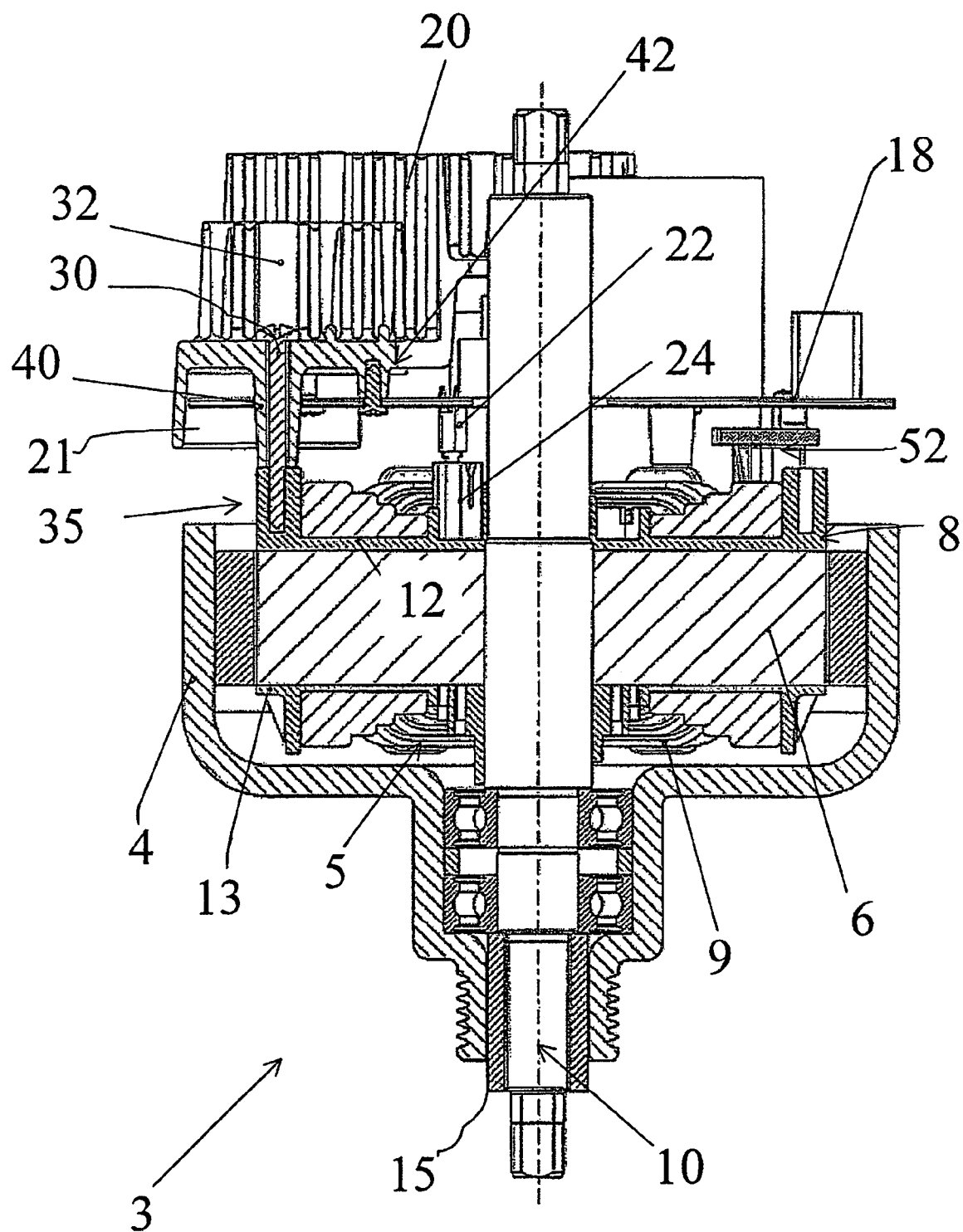
FIG. 4 illustrates a section of the synchronous electric motor according to the line IV-IV of FIG. 2.

On its whole, the stator 5 has, in the case of the illustrated solution (FIGS. 2, 3 and 4), a substantially cylindrical configuration, and it comprises a plurality of per se known pole pieces 6 each defined by a corresponding plurality of identical plates 9, pack-like arranged on top of each other, in mutual contact and mounted fixed on a central axis 10.

In the case of the illustrated solution, the pole pieces 6 are contained and supported by a frame 8 of the stator 5 made of two substantially plate-like elements 12 and 13, respectively.

The two plate-like elements 12, 13 are arranged on opposite sides, for example above and respectively below the pole pieces 6.

For the fixing to the central axis 10, the stator 5 has, in a per se known way, an axial passage 15, also substantially cylindrical, of predetermined diameter, or prismatic, and intended to be engaged by the axis 10.

The synchronous electric motor 3 also comprises an electronic control board 18 electrically connected to the motor itself and a heat sink element 20 associated with the electronic board 18.

The electronic board 18 is per se known, like the heat sink element 20 which has a foil-like configuration with a large heat exchange surface.

According to the present invention, the heat sink element 20 is mounted on the stator 5 in an axial extension thereof with a predetermined spaced relation therefrom.

Moreover, according to the invention, the electronic control board 18 is supported by the heat sink element 20, on a side thereof facing the stator 5.

In this way, according to the invention, the electronic control board 18 is fixed to the heat sink element 20 and it is arranged on a side of this latter so as to be on the side facing the stator 5 and close to this latter to obtain an electric connection having reduced wiring.

In other words, the electronic board 18 is supported by the heat sink 20 in an intermediate position between this latter and the stator 5.

Preferably, the heat sink element 20 is mounted above the stator 5 at a selected distance so as to allow the interposition of the electronic board 18.

Preferably, the electronic board 18 is housed in a recess 21 formed on the aforementioned side of the heat sink element 20 facing the stator 5.

In a preferred solution, to obtain the electric connection between the electronic board 18 and the stator 5, the synchronous electric motor 3 comprises first connector elements 22 of the board 18 projecting towards the stator 5 and second connector elements 24 of the stator 5 projecting towards the board 18.

In the case of the illustrated solution, the first and second connector elements 22 and 24, respectively, are connectors of the male/female clutch type, such as fastom connectors.

Preferably, the first and second connectors 22 and 24 are arranged in a substantially central area of the motor 3 about the axis 10, so as to be completely protected between the stator 5 and the heat sink 20.

Figure 5:
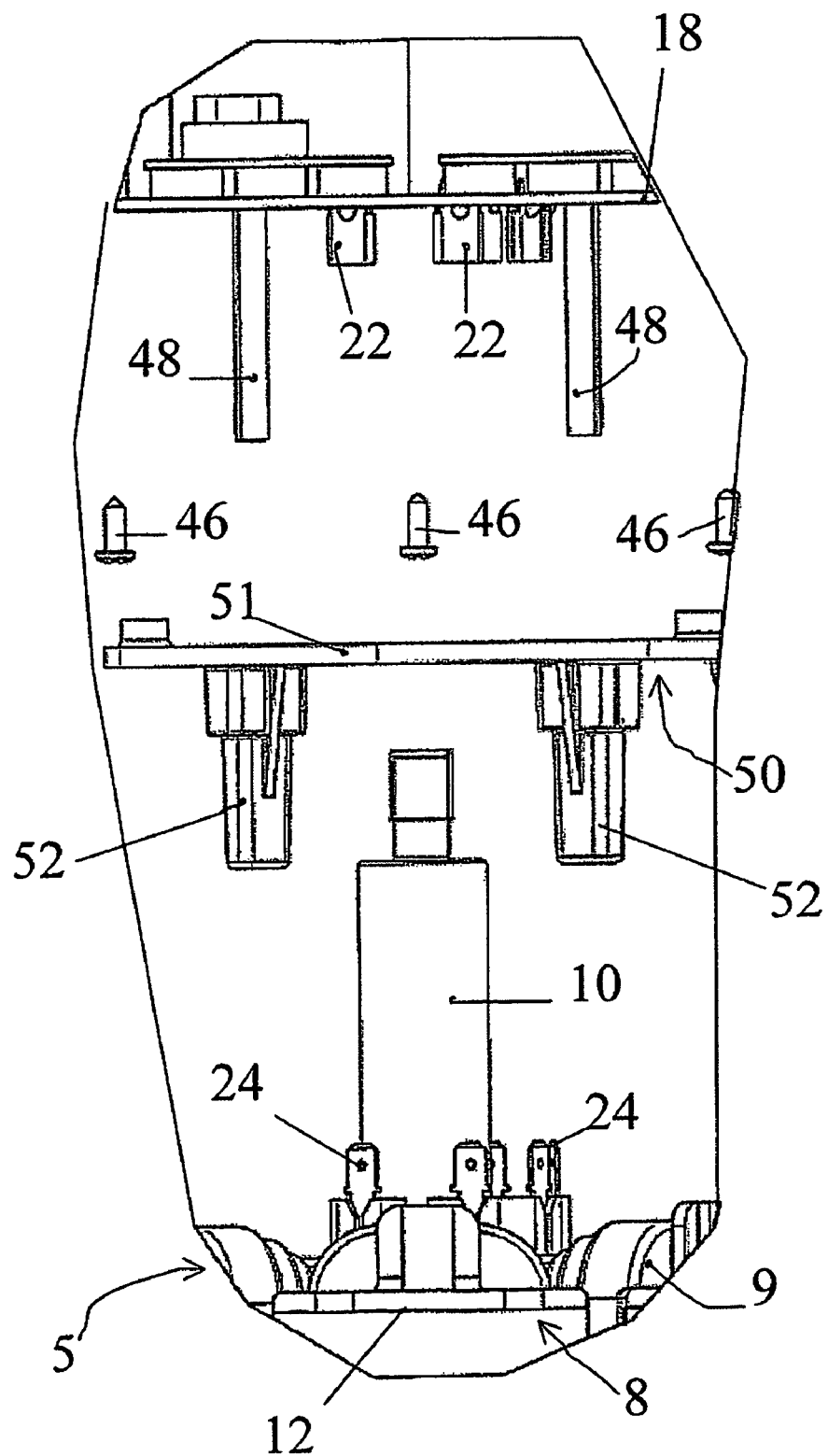
FIG. 5 illustrates the enlarged detail indicated with V in FIG. 3.

Preferably, the first and second connector elements 22 and 24 are respectively aligned substantially along a circumference portion about the axis 10 (see FIGS. 3 and 5), in particular in the case of the illustrated solution along the right circumference portion. This allows a connection univocality to be obtained between the electronic board 18 and the stator 5, without the risk of a mistaken electric connection.

According to another characteristic of the invention, the heat sink 20 is fixed directly onto the frame 8 of the stator 5 through locking screws 30. Preferably, the locking screws 30 can be screwed from outside the electric motor 3 so as to ease the fixing operations.

For such purpose, the sink element 20 comprises guides 32 to guide the insertion from the outside of the clamping screws 30 as well as the access of a tool for their screwing.

To ease the assembly of the heat sink 20, the electric motor 3 also comprises a plurality of first positioning elements 35 to guide and position the heat sink element 20 in a predetermined angular position on the frame 8 of the stator 5.

Figure 7:
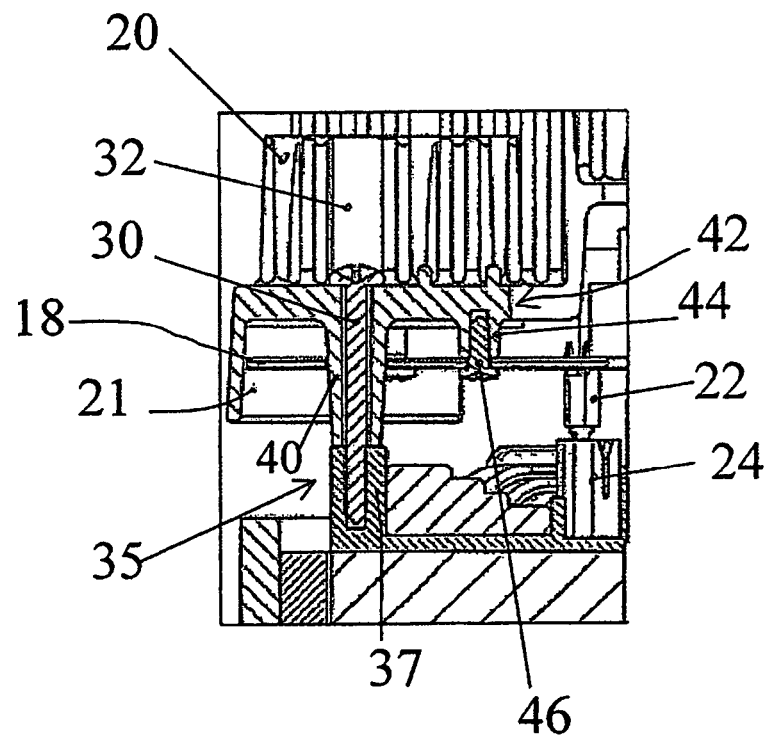
FIG. 7 indicates an enlarged detail of FIG. 4.

Preferably, the first positioning elements 35 internally comprise hollow bushings (FIG. 7), wherein the clamping screws 30 are suitable to be screwed.

Preferably, the first positioning elements 35 are aligned along a circumference around the axis 10 and with a predetermined angular relationship with respect to each other.

In the case of the illustrated solution, the first positioning elements 35 are three and they are arranged at 120° from one another with respect to the central axis 10.

Moreover, preferably, the first positioning elements 35 are arranged substantially parallel to the axis 10 and they are integrally made with the plate-like element 12 of the frame 8 of the stator 5.

In addition to the positioning elements 35, the electric motor 3 comprises spacer elements 40 to adjust the distance of the heat sink 20 from the stator 5.

Preferably, the spacers 40 are internally hollow and they are axially aligned with the first positioning elements 35.

In the case of the illustrated solution the spacer elements 40 are integrally made with the heat sink 20 and they have are tubular shape, to allow the clamping screws 30 to pass.

The sink 20 also comprises second positioning elements 42 for adjusting the fixing position of the electronic board 18.

In the case of the illustrated solution (FIG. 7), the second positioning elements 42 comprise internally hollow bushings 44, wherein corresponding clamping screws 46 are suitable to be screwed.

According to a further characteristic of the invention, the synchronous electric motor 3 comprises a support 50 for magnetic field sensors 48, which is axially interposed between the electronic board 18 and the frame 18 of the stator 5.

Preferably, the support 50 comprises a disc-like element 51 (FIG. 5) whereon a plurality of substantially glass-like elements 52 are fixed, which are arranged with the mouth facing the electronic board 18. The elements 52 define corresponding seats for housing magnetic field sensors 48, such as Hall sensors.

Preferably, the magnetic field sensors 48 are integrally connected to the electronic board 18, they project from this latter according to a direction parallel to the axis 10 so as to be retractably inserted inside the respective support seats 50.

Figure 6:
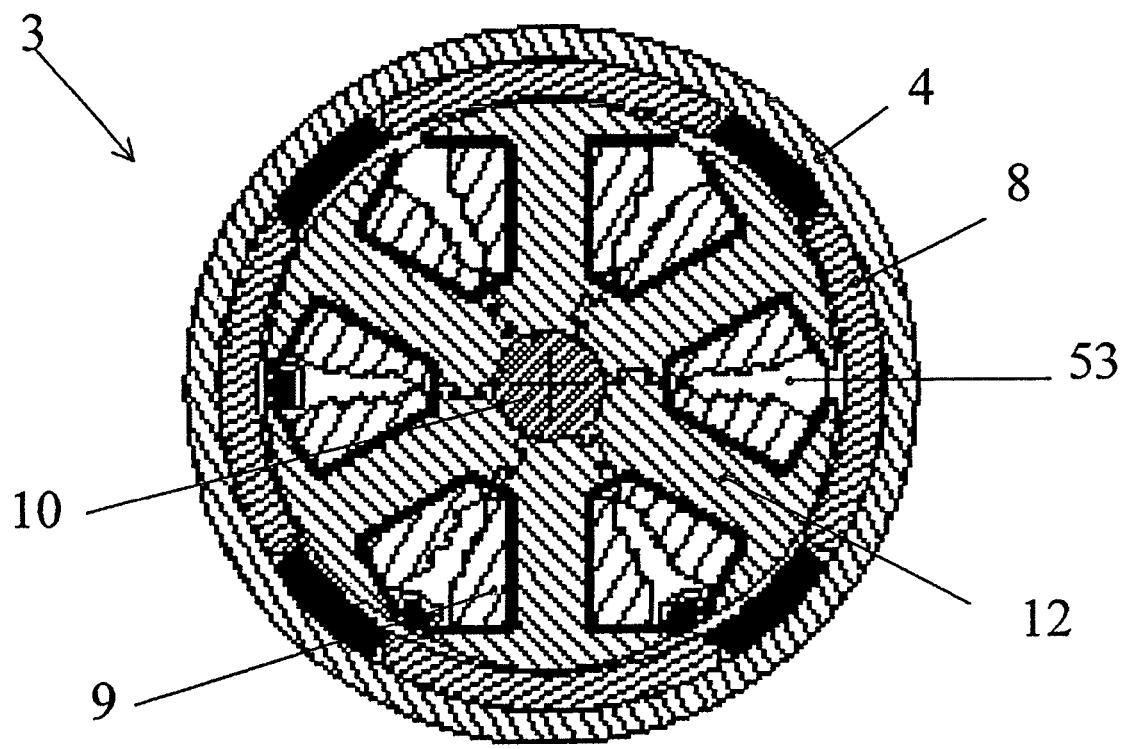
FIG. 6 indicates a section view of the synchronous electric motor according to the line VI-VI of FIG. 2.

Preferably, to ease a compact assembly of the support 50, the stator 5 comprises, between the stator windings 9, a plurality of cavities (FIG. 6), which are suitable to retractably receive the glass-like elements 52 of the support 50 including the respective sensors 48.

A synchronous electric motor according to the invention is assembled through an assembly method also object of the present invention.

The method comprises the steps of mounting an inner stator 5 fixed on a central axis 10, connecting the stator 5 to an electronic control board 18 of the motor 3;

fixing the electronic control board 18 onto a heat sink element 20 on a side thereof so that it is supported by the heat sink element 20; and mounting the heat sink element 20 on the stator 5 in an axial extension thereof and spaced therefrom, so that the electronic board is placed between the sink element 20 and the stator 5.

Basically, the assembly method according to the invention provides fixing, first, the electronic board 18 on the heat sink 20 on one side of this latter, and then mounting the heat sink 20 so that the electronic board 18 is on the side facing the stator 5 close to this latter. The electronic board 18 is thus arranged between the stator 5 and the heat sink 20.

In a preferred solution, the method according to the invention comprises a further step wherein the electronic board 18 is provided with first connector elements 22 projecting towards the stator 5 and the stator 5 is provided with second connector elements 24 projecting towards the electronic board 18. The first and second connector elements 22, 24 are electrically interconnected through direct clutch when the sink 20 and the electronic board 18 are mounted on the stator 5.

Basically, this allows the electronic board 18 to be electrically connected through the respective connectors 22 and 24 to the stator 5, at the time when the sink is mechanically fixed onto the stator 5.

Preferably, the heat sink 20 is fixed from outside the motor 3 onto a frame of the stator 5 through clamping screws 30.

According to another characteristic of the invention, before mounting the heat sink 20 on the stator 5, a support 50 for magnetic field sensors 48 is mounted on the stator 5, so as to be arranged between the stator 5 and the electronic board 18.

The main advantage of the synchronous electric motor according to the invention lies in that it allows easy assembly of the electronics on the stator, thus allowing an easy connection of the electronic board to the stator and a substantial reduction of the wiring.

Moreover, thanks to the fact that the electronic board is supported on the heat sink, it is not necessary to modify in any way the stator to allow the electric connection, thus allowing costs to be contained.

A further advantage is that the electronic board can be connected directly to the stator through the relative clutch connectors, when the sink is fixed onto the stator.

The axial arrangement of the heat sink on the stator also allows a globally compact motor to be obtained.

In this regard, the provision of arranging the electronic board in the relative recess formed in the heat sink is also particularly advantageous. This allows the electronic board 18 to be protected during assembly.

The interposition of the support of the magnetic field sensors between the stator and the electronic board also allows the assembly of the sensors to be simplified and a space reduction to be obtained.

In this regard, the retractable arrangement of the sensors between the stator windings, besides reducing the spaces, allows the sensors to be advantageously protected.

The use of positioning elements that allow the position of the heat sink to be adjusted when it is mounted on the stator so as to be able to obtain a correct and quick electric connection of the connectors of the electronic board with the stator is also particularly advantageous.

Furthermore, the use of bushings, which also have the function of screwing seats of the clamping screws, as positioning elements is also advantageous.

The spacer elements also have the advantage of adjusting the axial position of the heat sink with respect to the stator so as to allow the sensors to be positioned between the electronic board and the support.

The spacer elements realised in a tubular shape and aligned with the positioning elements also have the advantage of acting as passage seat and guide for the clamping screws.

Another advantage is given by the use of the clamping screws that allow simple assembly/disassembly from the outside of the heat sink and of the respective board in case of maintenance, without requiring any intervention on the motor.

The invention claimed is:

1. Synchronous electric motor for washing-machines and similar household appliances with rotary drum, of the type comprising
   an inner stator having respective stator windings mounted fixed on a central axis,
   an electronic control board electrically connected to the inner stator,
   a heat sink element associated with the electronic board, wherein the heat sink element is mounted on the stator in an axial extension thereof and spaced therefrom, and in that the electronic control board is supported by the heat sink on a side facing the stator.

2. Electric motor according to claim 1, wherein it comprises first connector elements of the electronic board projecting towards the stator and second connector elements of the stator projecting towards the electronic control board to obtain a connection of the electronic control board to the stator.

3. Electric motor according to claim 2, wherein the first and second connectors are connectors of male/female clutch type.

4. Electric motor according to claim 2, wherein the first and second connectors are arranged in a substantially central area around said axis.

5. Electric motor according to claim 2, wherein the first and second connectors are aligned substantially along a circumference portion about said axis.

6. Electric motor according to claim 1, wherein it comprises clamping screws that can be screwed from outside the electric motor to clamp the heat sink element on a frame of the stator.

7. Electric motor according to claim 6, wherein the heat sink element comprises guides to guide the insertion of the clamping screws and the access of a tool for their screwing.

8. Electric motor according to claim 1, wherein it comprises a plurality of first positioning elements to position the sink element in a predetermined angular position on the stator.

9. Electric motor according to claim 6, wherein the first positioning elements comprise internally hollow bushings, wherein the clamping screws are suitable to be screwed.

10. Electric motor according to claim 8, wherein the first positioning elements are integrally realised with a frame of the stator.

11. Electric motor according to claim 1, wherein it comprises spacer elements for adjusting the axial position of the heat sink with respect to the stator.

12. Electric motor according to claim 9, wherein the spacer elements have tubular shape and they are axially aligned to the first positioning elements to guide the passage of the clamping screws.

13. Electric motor according to claim 11, wherein the spacer elements are integrally made with the heat sink element.

14. Electric motor according to claim 8, wherein the first positioning elements are arranged aligned along a circumference around the axis and with a predetermined angular relationship with respect to each other about the axis.

15. Electric motor according to claim 14, wherein the first positioning elements are three and they are arranged at 120° from one another with respect to the central axis.

16. Electric motor according to claim 1, wherein it comprises second positioning elements of the electronic board on the sink element.

17. Electric motor according to claim 16, wherein the second positioning elements comprise internally hollow bushings, wherein corresponding clamping screws are suitable to be screwed to clamp the electronic board on the heat sink element.

18. Electric motor according to claim 1, wherein the electronic board is housed in a recess formed on the heat sink element.

19. Electric motor according to claim 1, wherein it comprises a support for magnetic field sensors arranged between the electronic board and the stator.

20. Electric motor according to claim 19, wherein the support comprises a disc-like element and a plurality of glass-like elements fixed to the disc-like element and defining corresponding seats for housing the magnetic field sensors.

21. Electric motor according to claim 20, wherein the magnetic field sensors are fixed to the electronic board, projecting from this latter, and they are retractably inserted in the glass-like elements.

22. Electric motor according to claim 19, wherein a plurality of cavities are formed between the stator windings to receive the glass-like elements of the support.

23. Electric motor for washing-machines and similar household appliances with drum, of the type comprising
an inner stator having relative stator windings mounted fixed on a central axis,
an electronic control board electrically connected to the stator,
wherein the electronic control board is mounted on the stator and in that it comprises first connector elements of the electronic control board projecting towards the stator and second connector elements of the stator projecting towards the electronic control board to obtain a connection of the electronic control board to the stator.

24. Electric motor according to claim 23, wherein the first and second connectors are connectors of the male/female clutch type.

25. Electric motor according to claim 24, wherein the first and second connectors are arranged in a substantially central area around said axis.

26. Electric motor according to claim 25, wherein the first and second connectors are aligned substantially along a circumference portion.

27. Assembly method of an electric motor for washing-machines and similar household appliances with rotary drum, of the type comprising the steps of
mounting an inner stator fixed on a central axis,
connecting the stator to an electronic control board of the motor and
associating a heat sink element with the electronic board, wherein the electronic control board is fixed onto the heat sink element on a side thereof, and
the heat sink element is mounted on the stator in an axial extension thereof and spaced therefrom, so that the electronic board is placed between the sink element and the stator.

28. Method according to claim 27, wherein the electronic control board is provided with first connector elements projecting towards the stator and in that the stator is provided with second connector elements projecting towards the electronic board and in that the first and second connector elements are electrically interconnected when the sink and the electronic board are mounted on the stator.

29. Method according to claim 27, wherein the heat sink is fixed to a frame of the stator through clamping screws.

30. Method according to claim 29, wherein the fixing of the heat sink onto the stator is adjusted through positioning elements.

31. Method according to claim 29, wherein the clamping screws are screwed from outside the motor.

32. Method according to claim 28, wherein, before mounting the heat sink on the stator, a support for magnetic field sensors is mounted on the stator.

* * * * *